March 26, 1940.  J. H. HAMMOND, JR  2,194,548
NAVIGATIONAL GUIDE SYSTEM
Filed Jan. 23, 1937   3 Sheets-Sheet 1
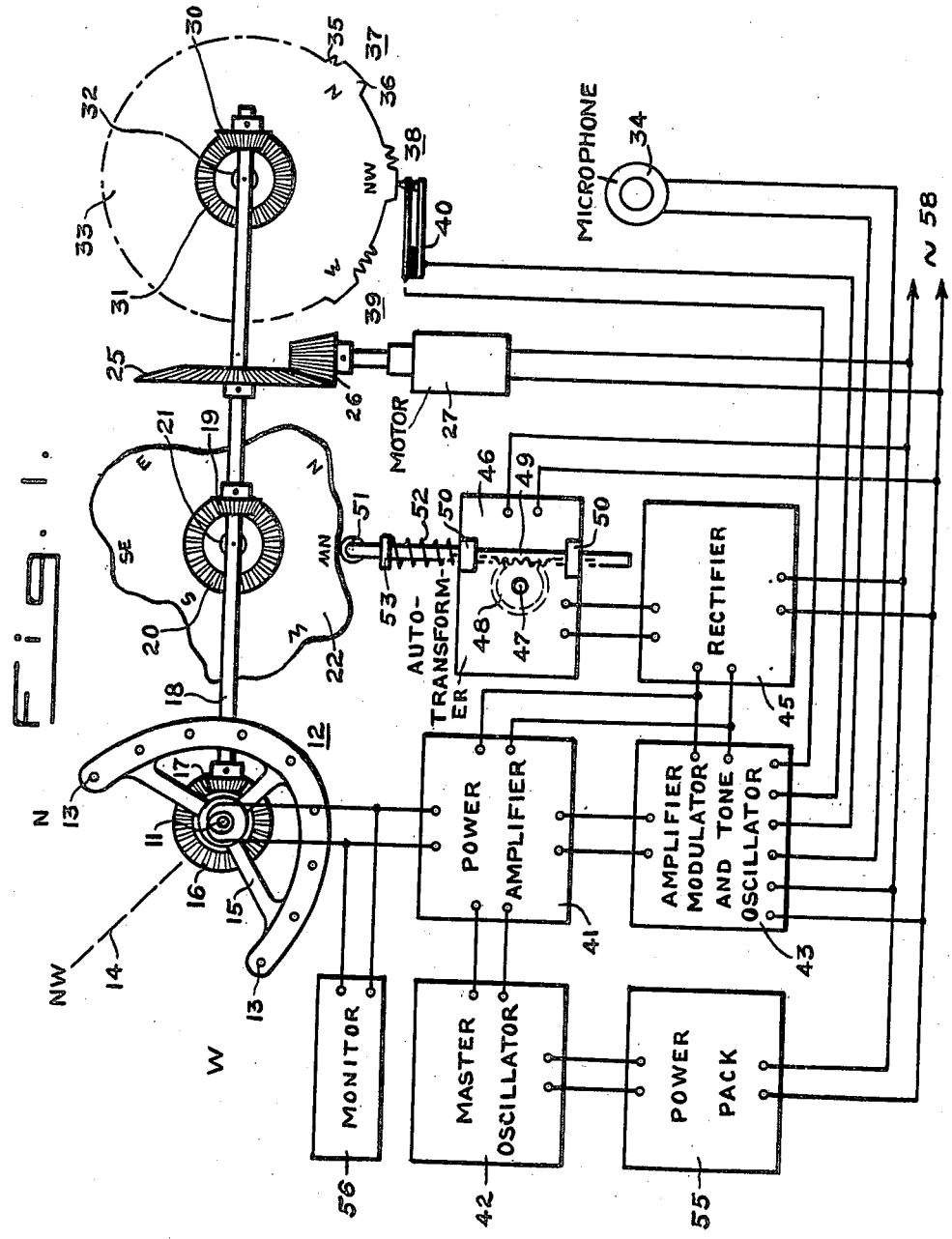
INVENTOR
JOHN HAYS HAMMOND, JR.
BY
ATTORNEY

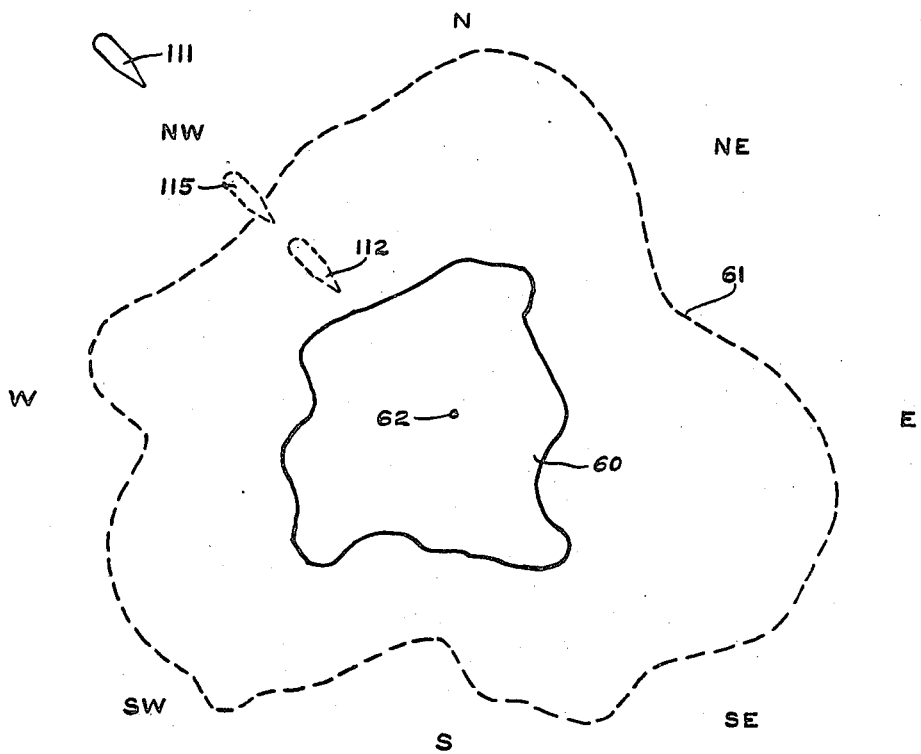
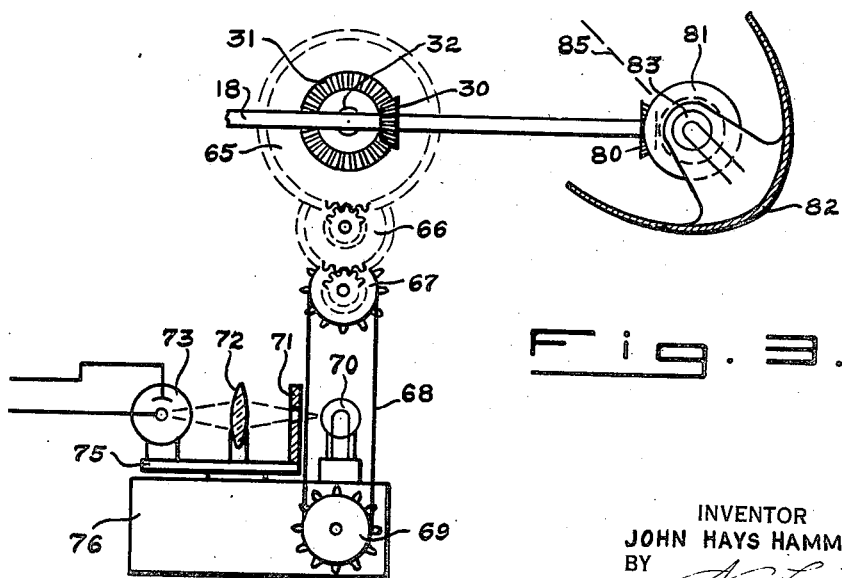

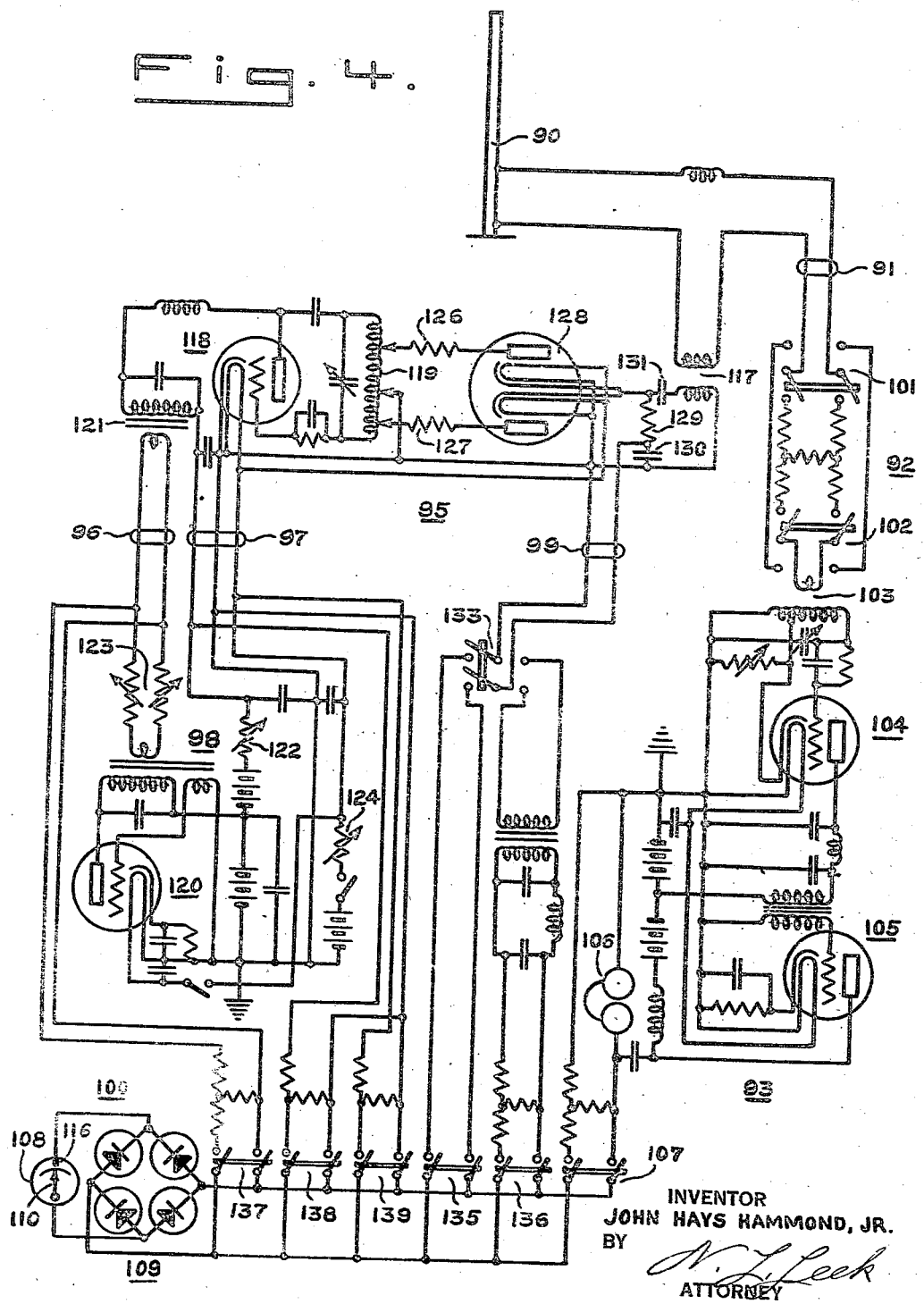

Patented Mar. 26, 1940

2,194,548

UNITED STATES PATENT OFFICE 2,194,548

NAVIGATIONAL GUIDE SYSTEM

John Hays Hammond, Jr., Gloucester, Mass.

Application January 23, 1937, Serial No. 121,967

6 Claims. (Cl. 250—11)

This invention relates to navigational systems and more particularly to a system for determining the direction and distance of a craft from a given point.

An object of the invention is to provide a novel and relatively simple system of the above type which is suitable for use on small boats or other locations where expensive and complicated equipment and skilled attendants are unavailable.

Another object is to provide a novel system which may be used to indicate the position of the vessel with respect to a given contour line representing the approach to dangerous waters.

Another object is to provide a system of the above type which can be easily calibrated to insure the correct operation thereof.

Various other objects and advantages will be apparent as the nature of the invention is more fully disclosed.

A feature of the invention consists in the provision of a rotating radio beam located, for example, on an island or other point which is surrounded by dangerous waters.

In accordance with one embodiment of the invention, the strength of the beam is varied automatically as it rotates, in such a manner that a predetermined, constant field strength occurs at all points along the contour line about the dangerous locality. This variation in beam strength is obtained by varying the power of the transmitter in synchronism with and at a predetermined function of the rotation of the beam.

A designating signal may also be transmitted, such as predetermined groups of dots and dashes or voice signals which are varied in accordance with the angular position of the beam to indicate the direction of the beam at the time the signals are heard. For example, a certain group of dots and dashes may indicate North or the signal may be modulated with the word North. This would be timed in synchronism with the rotating beam to occur when the beam points in that direction. Other suitable signals would indicate the time when the beam is pointing at other points of the compass.

In one embodiment this designating signal is used to modulate the rotating beam so that the beam characteristics can be used to determine both distance and direction. The signals, however, can be separately transmitted if desired.

The approaching vessel can determine its direction and distance by receiving the rotating beam and observing, as the beam sweeps past the vessel in its rotation, the maximum field strength and the direction designating signal at the time of greatest signal intensity. The former indicates the distance from the predetermined contour line and the latter indicates the direction with respect to the transmitter. When the field strength at its maximum point exceeds a predetermined value, the navigator is warned that he is at the contour line and is approaching dangerous waters.

In a further embodiment of the invention, the rotating beam is maintained at a constant intensity, although the direction designations are impressed thereon in the manner above mentioned. In determining the location of the receiver, the field strength is measured and the measurement is referred to a chart which shows the known field strengths at different distances from the transmitter and which may have the contour line superimposed thereon so that the exact location of a vessel with respect to the danger line can be easily determined.

Another feature of the invention consists in the provision of calibrating means at the receiver so that the correct operation thereof can be assured. In one embodiment, this calibrating means comprises a local oscillator and a local source of modulation having suitable indicating means and adjustments so that they may be adjusted to a fixed standard. This standard energy is then applied to the input of the receiver to permit the receiver to be calibrated accordingly. With the receiver calibrated in this manner an accurate measurement of the rotating beam can be assured.

Various other features of the invention consist in the details of construction and combinations of parts hereinafter more fully set forth.

Although the invention can be embodied in various forms and is capable of various uses, the broader aspects thereof will be better understood by referring to the following description, taken in connection with the accompanying drawings, in which one embodiment thereof has been set forth for purposes of illustration only.

In the drawings:

Fig. 1 is a diagrammatic view of one embodiment of the transmitting apparatus used in this invention;

Fig. 2 is a diagrammatic view showing the positions of a vessel approaching dangerous waters;

Fig. 3 is a fragmentary view of a modified form of the invention used to replace part of the mechanism shown in Fig. 1; and Fig. 4 is a schematic diagram of the receiver and calibrating apparatus to be used in connection with the transmitter shown in Fig. 1.

Like reference characters denote like parts in the several figures of the drawings.

In the following description and in the claims parts will be identified by specific names for convenience, but they are intended to be as generic in their application to similar parts as the art will permit.

Referring to the accompanying drawings and more particularly to Fig. 1, the embodiment of the invention shown comprises an antenna or beam radiator 11 and a reflector assembly 12 consisting of a plurality of reflecting radiators 13 arranged in the form of a parabola with its axis along the radio beam line 14 and with the radiator 11 at the focus. The reflecting radiators 13 are mounted in a frame 15 which is rotatably mounted with respect to the radiator 11. Secured to the frame 15 is a beveled gear 16, which meshes with a beveled pinion 17 secured to a shaft 18.

Secured to the shaft 18 is a second beveled pinion 19, which meshes with a beveled gear 20 secured to a rotatable shaft 21. Secured to the shaft 21 is a cam 22 the shape of which is described in connection with Fig. 2.

A beveled gear 25 is secured to the shaft 18 and meshes with a beveled pinion 26 which is driven at a constant speed by a motor 27.

Secured to the shaft 18 is a third beveled pinion 30 which meshes with a beveled gear 31 secured to a rotatable shaft 32. Secured to the shaft 32 is a signal record disc 33 which is provided with dots 35 and dashes 36. These dots and dashes are arranged in groups such as 37, 38, 39 etc. each of which comprises a dash 36 and one or more dots 35. The number of dots increases from group to group. That is, group 37 has one dot, group 38 two dots, group 39 three dots, etc. A key 40 is operated by the dots and dashes 35 and 36 and is connected to control the tone oscillator of an amplifier modulator 43. A microphone 34 is also connected to the amplifier modulator 43 to impress voice signals thereon when desired.

The beam radiator 11 is supplied with energy from a power amplifier 41 which is excited by a master oscillator 42 in a well known manner. The power amplifier 41 is modulated by the modulator amplifier 43 in the usual manner. A rectifier 45 supplies plate energy for both the power amplifier 41 and modulator 43. The amount of energy supplied by the rectifier 45 is variable and is controlled in accordance with the setting of an auto-transformer 46.

This transformer is varied by the rotation of the shaft 47 to which is secured a gear 48. This gear meshes with a rack 49 which is slidably mounted in brackets 50. At its upper end the rack 49 is provided with a roller 51 which engages the periphery of the cam 22 and is held against this cam by means of a compresion spring 52 acting against a collar 53 attached to the rack 49.

The master oscillator 42 may be supplied with fixed plate potential from a power pack 55. A monitor 56 may be suitably coupled to the output of the power amplifier for observing and indicating the carrier frequency, carrier strength, and modulation.

Power is supplied to the power pack 55, amplifier modulator 43, rectifier 45, transformer 46, and motor 27 from an A. C. power line 58.

It is to be understood that the rectifier 45, the amplifier modulator and tone oscillator 43, the power amplifier 41, the monitor 56, the master oscillator 42, and the power pack 55 are of well known and standard construction containing the usual vacuum tubes and control circuits arranged to excite the radiator 11 with a modulated carrier in the short wave range to emit a directional radio beam which is well known in the art. Consequently they have not been shown in detail. The strength of the carrier is varied by means of the cam 22, acting on the auto-transformer 46 to control the power supplied from the rectifier 45 to the amplifier modulator 43 and the power amplifier 41.

In the operation of the transmitter shown in Fig. 1 a continuous carrier wave is generated by the master oscillator 42 and is fed to the power amplifier 41. The output of the master oscillator is substantially constant in strength, as it is fed from the power pack 55, which does not vary in voltage. The power amplifier 41 amplifies the radio frequency energy to a degree dependent upon the power fed by the rectifier 45 which is dependent upon the setting of the auto transformer 46, which in turn is dependent upon the shape of the cam 22.

The energy produced by the power amplifier 41 is tonally modulated by the energy from the amplifier modulator and tone oscillator 43, so that there is radiated along the radio beam line 14 a signal having constant audible tone which varies in intensity with the shape of the cam 22. When the key 40 is closed, due to the rotation of the record 33, the tone modulation produced by the amplifier modulator and tone oscillator 43 is changed and therefore the pitch of the signal radiated along the beam line 14 is changed accordingly.

It is thus seen that each time a group of dots and dashes 37, 38, 39, etc. operates the key 40 a corresponding series of variations in tone will be produced in the radio beam emitted by the radiator 11.

The shape of the cam 22 is determined as shown in Fig. 2, which depicts an island 60, surrounded by a dotted line 61 representing the contour of the bottom of the sea at a given depth, say 30 feet, inside of which it would be dangerous for shipping to navigate. The cam 22 is constructed with a contour which is a mirror image of the dotted line 61. The center of the cam 22 is determined by the position of the point 62 on the island 60 where the transmitter shown in Fig. 1 is located.

As the motor 27 drives the shaft 18 at a uniform speed the radio beam will rotate slowly in a counter clockwise direction. At the same time the cam 22 and the signal record disc 33 will rotate in a counter clockwise direction at the same speed. As the dots and dashes 35 and 36 on the disc 33 engage the key 40, signals of modulated energy will be sent out along the beam. These signals will vary in energy in accordance with the contour of the cam 22, as already described, so that the signal strength of the beam, as the beam rotates, will be the same at all points on the contour line 61.

The dashes 36 are positioned with respect to the points of the compass, so that the middle of the dash 36 of the group 37 will be located under the key 40 when the beam is pointing due north; the middle of the dash 36 of the group 38 will be under the key 40, as shown in Fig. 1, when the beam is pointing northwest; etc. As the beam approaches the points of the compass: north, northwest, etc., the dots 35 will cause groups of short signals to be sent out along the beam. Thus as the beam approaches north one short signal will be sent out followed by a long signal the middle of which will occur when the beam is due north. As the beam approaches northwest two short signals will be sent out followed by a long signal. In this way each point of the compass will be designated by a designating signal followed by a dash and in each case the signal strength along the contour line 61 of dangerous waters will be constant. It will be understood that in place of dots preceding the indicating dash, any suitable combination of dots and dashes may be used for designating the bearing at which the beam will be directed when the indicating dash is sent. Furthermore the direction may be indicated by the beginning or end of the long dash instead of by the middle thereof.

The microphone 34 is used for communication purposes on the beam in case it is desired to check up on the operation of the system or to send messages to the approaching vessel. In this case, the microphone circuit will replace the keyed oscillator as a source of modulating energy.

In Fig. 3 is shown a modified form of transmitter in which the disc 33 is replaced by a gear 65, which through a train of gears 66 drives a sprocket wheel 67 at a relatively high speed. Passing over the sprocket wheel 67 is a continuous film 68 which also passes over a second sprocket wheel 69. On the film 68 is a spiral sound track with various numbers recorded thereon such as one, two, three, etc. or the words north, northwest, west, etc. Between these words is recorded a uniform audible tone.

Located behind the film 68 is a lamp 70 the light from which passes through the film, an aperture plate 71 and a lens 72 and is focused upon a photo-electric cell 73. The aperture plate 71, lens 72 and cell 73 are mounted on a movable carriage 75 which moves across the top of a casing 76. The carriage 75 moves so that the light from the lamp 70 always passes through the spiral record on the film 68. At the end of this record the carriage 75 automatically snaps back to its initial position and starts over again. This mechanism is of well known and standard construction and need not be more fully described herein. The photo-electric cell 73 is connected to the amplifier modulator 43 to replace the microphone 34 as a source of modulating energy.

The shaft 18 may also be extended to the right and have secured to its end a beveled pinion 80 which meshes with a beveled gear 81. Secured to this gear is a parabolic reflector 82 at the focus of which is mounted a lamp 83 which throws a beam of light 85 along the axis of the parabolic reflector 82.

In the operation of the modified form of transmitter shown in Fig. 3, the mechanism is so arranged that, when the radio beam points north, the word "north" of the record on the film 68 will be transmitted by the radio beam. When the beam points northwest, the word "northwest" will be transmitted, etc. The light beam 85, which may constitute the beam of the lighthouse at which the transmitter is located, will also rotate in synchronism with the radio beam.

The transmitter is therefore characterized by the establishing of a standard field strength at the border line between safe and unsafe waters. For example, the standard frequency might be 90 megacycles, the standard modulation frequency 800 cycles, and the standard field strength 10,000 microvolts per meter at 60 per cent modulation at a point 100 feet above the water along the danger line. This standard field strength occurs at different points along the depth contour line in succession, and the position of the point on the contour line at which it exists is indicated by designating signals, at frequencies other than the standard 800 cycles.

Hence, by determining the maximum field strength and the direction of the beam as it sweeps past the vessel, the exact position thereof can be ascertained. The field strength can be determined by suitable measuring apparatus, to be described, which can also be used to receive the signal indicating direction.

In the above embodiment the beam is varied to produce a constant field strength along the contour line. The system could also be used to emit a beam of constant intensity in which case a chart would be employed on the vessel to show the variation in field strength along the contour line, or the chart could show concentric lines of equal field strength with the danger line superimposed thereon. The direction would then be determined in the same manner as above described and the field strength measured. Reference to the chart would then give the exact location of the vessel and distance from the danger line.

In Fig. 4 is shown a receiving and calibrating system for receiving the energy radiated along the beam, and determining the location of the ship carrying the receiver. This system is located upon the approaching vessel and comprises an antenna 90, which is connected by a transmission cable 91 to an attenuator 92 which in turn is coupled to a receiver 93. A calibrator 95 is coupled to the antenna system and is connected by a two wire cable 96 and a three wire cable 97 to calibrator control 98 and by a two wire cable 99 to an indicator system 100 which is also connected to the calibrator control 98.

The attenuator system 92 is provided with two double-pole, double-throw switches 101 and 102 for throwing in or out the attenuator 92 which is only used during calibration of the receiver. The energy passing through switch 102 is coupled to the receiver 93 by means of a transformer 103. The receiver 93 is shown as of the regenerative type and comprises a detector stage 104, with the usual regeneration and tuning controls, and an audio-frequency amplifier stage 105. Across the output of the receiver 93 are headphones 106. The output circuit of the receiver 93 is also connected through a double-pole, single-throw switch 107 to the indicator 100. The receiver 93 is shown in simplified form in Fig. 4. It is to be understood that any standard type of receiver may be used and that the above showing is only for purposes of illustration. The attenuator 92 may also be of any standard type.

The indicator 100 comprises a meter 108, operative either upon direct or alternating current by use of rectifier system 109 and provided with a pointer 110.

If a vessel 111 is approaching the island 60 from the northwest as shown in Fig. 2 the energy sent out by the radio beam will be picked up by the antenna 90 and, after bypassing the attenuator 92, will be detected, and the resultant audio signal amplified by the amplifier 105 and fed to the indicator 100 where the intensity of the received energy will be indicated on the meter 108, thus indicating the field strength at the antenna 90. As the vessel approaches the island 60 the maximum field strength during each rotation of the beam will increase and the pointer 110 of the meter 108 will move to the right, indicating the increase in this field strength.

When the approaching vessel reaches the position indicated by the dotted line 115 where it is just entering the danger zone 61, the field strength of the beam at the maximum of the beam will be of predetermined intensity as described in connection with the transmitter shown in Fig. 1. The predetermined field strength will cause the pointer 110 to point to a red line 116 marked on the meter 108 or may be read directly from the meter. If the vessel approaches nearer to the island 60 than the line 61 as shown at 112 the field strength at the antenna 90 will increase, thus causing the pointer 110 to move to the right of the line 116 on the meter 108.

It is thus seen that the navigator of a vessel approaching the island 60 would know, by watching the pointer 110 just when he was crossing the line 61 and entering dangerous waters. As long as the pointer 110 remained to the left of the line 116 the navigator would know that he was in safe waters, but as soon as it crossed the line 116 to the right he would know that he was entering dangerous waters and would steer his vessel accordingly. With a constant beam he would read the field strength and refer to his chart for his position.

As described in connection with Fig. 1 the tone of the radio beam 14, as it rotates, is varied to produce a series of dots followed by a dash. The number of these dots varies with the position of the beam, as for example one dot may be transmitted as the beam approaches north, two dots as it approaches northwest, three dots as it approaches west, etc. In this way the navigator may determine his direction with respect to the transmitter located at 62 by noting the number of dots sent at the time of greatest intensity of signal. It will be understood that the signals used will be sufficiently strong as to be audible even when the beam is ten to thirty degrees away from the maximum. The dash is so located that its mid-point or other known point, will occur when the beam is pointing due north, due northwest, due west, etc. In this way the navigator may be able to determine his position with great accuracy. In case the line 61 is very irregular, the line of equal field strength may be somewhat distorted, so that the point of maximum intensity may not occur directly along the axis of the beam. In case this effect should be found to exist, the dashes 36 on the record disc 33 may be displaced sufficiently to correct for this discrepancy.

In practice it would be found that the indication of the meter 108 would be subject to drift due to variations of receiver adjustment, deterioration of tubes, etc., so that it is preferable to provide a calibration circuit so that the receiver may, by adjustment of its controls, correctly indicate the field strength.

For this purpose the calibrator 95 is provided and is preferably located near the antenna system to which it may be coupled by a transformer 117, and is used to produce in the antenna system a signal of the same general characteristics as the incoming signal and of known characteristics as to signal strength and modulation. This calibrator may be used from time to time for the purpose of adjusting the receiver to its proper setting.

The calibrator 95 comprises an oscillator 118 by which energy is generated, preferably of half the frequency radiated by the beam. This oscillator may be of the well known "Hartley" type which permits the oscillator coil 119 to be tapped at the ground point of the system. The oscillator 118 may be suitably modulated by power, for example at 800 cycles, from an oscillator 120, located in the calibration control system 98, and sent up the cable 96, which feeds through a transformer 121 into the plate circuit of the oscillator 118.

Three sets of rheostats 122, 123 and 124 are provided in the oscillator 98 for controlling the energy, degree of modulation and filament voltage, respectively.

The output of the oscillator 118 is fed through two resistors 126 and 127, tapped on the oscillator coil 119, to two plates of a double rectifier 128. This rectifier produces; (1) direct current by which the strength of signals of the oscillator is indicated, (2) tonal currents by which the modulation of the signals of the oscillator are indicated, and (3) energy of double the frequency of the oscillator, by which the antenna circuit of the receiver is excited. Between the cathodes of the rectifier 128 and ground are connected in series a resistor 129 and a condenser 130, by which direct current and tonal current are sent down the two wire cable 99 to the indicator system 100. A blocking condenser 131 is connected between the cathodes of the tube 128 and the primary of the transformer 117 which energizes the receiving antenna.

By this system it is possible to excite the receiver locally with the same type of signal as transmitted by the beam and at the energy level corresponding to the standard signal produced by the transmitter along the contour line. The energy and degree of modulation may be of a fixed value and may be determined by the reading of the meter 108 and adjusted by rheostats 122 and 123.

The calibration may be effected by first throwing the switch 133 to the left and closing the switch 135 to feed the radio frequency energy from the rectifier 128 into the calibrating system where it is indicated on the meter 108. This is adjusted to a standard value by the rheostat 122. The calibrator 95 is now supplying a predetermined standard excitation. The switch 133 is then thrown to the right and the switch 136 is closed to feed the tonal A. C. output of the rectifier 128 to the indicator 100. The meter 108 now shows the modulation which is adjusted to a standard value by the rheostat 123.

When the carrier strength and modulation have been properly set to the standard value as above described, by adjustment of rheostats 122 and 123, the attenuator 92 is connected in the transmission line by closing switches 101 and 102 and the output of the receiver 93 is connected to the indicator 100 by closing the switch 107. The calibrator now energizes the receiver with a signal which produces the same response as the beam signal at the contour line. The receiver is now adjusted, preferably when the beam is directed away from the ship, by adjusting the receiver regeneration, and tuning, etc. until the standard output is obtained, as indicated, for example, by the needle 110 registering with the red mark 116. The receiver is now in condition to correctly indicate the field strength of the transmitted beam. It is to be understood that suitable attenuation networks may be incorporated in the circuits with the various switches 107, 135 and 136 to produce the desired reading on the meter 108 when the correct adjustments are made. To simplify the manipulation the attenuation may be such that the reading is taken at the red line 116 in each instance.

When the switch 137 is closed, the signal voltage of oscillator 120 may be read on the meter 108. When the switch 138 is closed, the plate voltage of the oscillator 118 may be read on the meter 108, and when the switch 139 is closed, the filament voltage of this oscillator may be read on the same meter. These three switches are provided for checking the performance of the calibrator and receiver circuit, and the rheostats 122, 123, and 124 may be marked with red lines indicating when tubes should be replaced to insure that the standard signal can be attained. Further, any abnormality in setting necessary for obtaining the required signal indication may indicate that the antenna system should be checked up. These switches 137, 138 and 139 and their associated circuits may be omitted if such measurements are not required.

When the modified form of transmitter shown in Fig. 3 is used the constant pitch tone recorded on the film 68 will be heard in the headphones 106 broken by the words "north", "northwest", "west", etc. By listening to the word which is nearest to the point of loudest intensity of the tone the navigator will know his position with respect to the transmitter 62.

It will be understood that the transmitter beam is monitored as to strength and modulation, and that the receiving equipment may be checked from time to time by placing the ship at a calibrating location. In certain instances the calibration system can be omitted and the receiver can be checked in other ways, as by comparing with a calibrated receiver from time to time or receiving a standard signal the value of which is known.

It is noted that the embodiment of the invention above described provides a system which may be readily and conveniently used for indicating the position of vessels with respect to a given locality. This system can be used in conjunction with the usual lighthouse service or may be supplemental thereto. It is to be understood that only so much of the system has been shown as is necessary to an understanding of the invention and that many of the parts incorporated therein are of standard and well known construction. The invention is, accordingly, not to be limited to the particular form of equipment shown, but various changes and modifications may be made therein as will appear to a person skilled in the art. The invention is only to be limited in accordance with the following claims when interpreted in view of the prior art.

What is claimed is:

1. The method determining position which comprises producing a substantially horizontal beam of radiant energy, rotating said beam about a vertical axis, varying the strength of said beam in synchronism with the rotation thereof so as to circumscribe the source with an irregular line of equal field strength having a predetermined contour, and determinig at a receiving point the maximum field strength of said beam as it sweeps past said point to thereby indicate the position of said point with respect to said contour line.

2. The method of determining position which comprises producing a substantially horizontal beam of radiant energy, rotating said beam about a vertical axis, varying the strength of said beam in synchronism with the rotation thereof so as to circumscribe the source with an irregular line of equal field strength having a predetermined contour, transmitting a signal synchronized with the rotation of said beam to designate the different angular positions thereof, determining at a remote point the maximum field strength of said beam as it sweeps past said point as an indication of distance with respect to said contour line and simultaneously receiving the signal to determine the direction of said beam at its point of maximum intensity.

3. The method of determining position which comprises producing a substantially horizontal beam of radiant energy, rotating said beam about a vertical axis, varying the strength of said beam in synchronism with the rotation thereof so as to circumscribe the source with an irregular line of equal field strength having a predetermined contour, modulating said beam with a signal synchronized with the rotation of said beam to designate the different angular positions thereof, determining at a remote point the maximum field strength of said beam as it sweeps past said point as an indication of distance with respect to said contour line and simultaneously receiving the signal to determine the direction of said beam at its point of maximum intensity.

4. A navigational system comprising means to produce a horizontal beam of radiant energy having a field strength decreasing as the function of the distance from its source, means rotating said beam about a vertical axis and means varying the strength of said beam in synchronism with its rotation so as to circumscribe the source with an irregular line of equal field strength having a predetermined contour and a receiving station having means to determine the maximum field strength of said beam as it sweeps past said point to thereby indicate the position of said point with respect to said contour line.

5. A navigational system comprising means to produce a substantially horizontal beam of radiant energy having a field strength decreasing as a function of the distance from its source, means rotating said beam about a vertical axis, means varying the strength of said beam in synchronism with the rotation thereof so as to circumscribe the source with an irregular line of equal field strength having a predetermined contour, means transmitting a signal varying in synchronism with the rotation of said beam to designate the different angular positions thereof, and a receiving station comprising means to determine the maximum field strength of said beam as it sweeps past said station as an indicator of distance from said contour line and means to simultaneously receive said signal for determining the direction of said beam at its point of maximum intensity.

6. A navigational system comprising means to produce a substantially horiontal beam of radiant energy having a field strength decreasing as a function of the distance from its source, means rotating said beam about a vertical axis, means varying the strength of said beam in synchronism with the rotation thereof so as to circumscribe the source with an irregular line of equal field strength having a predetermined contour, means modulating said beam with a signal varying in synchronism with the rotation of said beam to designate the different angular positions thereof, and a receiving station comprising means to determine the maximum field strength of said beam as it sweeps past said station as an indicator of distance from said contour line and means to simultaneously receive said signal for determining the direction of said beam at its point of maximum intensity.

JOHN HAYS HAMMOND, Jr.